United States Patent [19]

Bonaddio

[11] 3,967,517
[45] July 6, 1976

[54] GLASS SCORING HEAD AND METHOD
[75] Inventor: Robert M. Bonaddio, Monroeville, Pa.
[73] Assignee: PPG Industries, Inc., Pittsburgh, Pa.
[22] Filed: July 8, 1975
[21] Appl. No.: 594,154

[52] U.S. Cl. ................................. 83/7; 33/32 E; 83/8; 83/12; 225/96.5
[51] Int. Cl.² .......................................... B26D 3/08
[58] Field of Search ............... 83/7, 8, 12; 225/96.5; 33/32 E

[56] References Cited
UNITED STATES PATENTS

| 1,798,625 | 3/1931 | Owen | 33/32 E X |
| 1,972,210 | 9/1934 | Waldron | 225/96.5 |
| 3,276,302 | 10/1966 | Insolio | 83/8 |
| 3,399,586 | 9/1968 | Insolio et al. | 83/12 X |

*Primary Examiner*—Leon Gilden
*Attorney, Agent, or Firm*—Dennis G. Millman

[57] ABSTRACT

When subdividing sheets of glass, cutting defects near the edge of the sheet are reduced by initiating scoring action at the very edge of the sheet with a scoring wheel which is rolling and under scoring pressure as it contacts the edge. This is accomplished by providing under the scoring wheel a platform whose upper surface is substantially coplanar with or tangential to the upper surface of the glass, so that the scoring wheel rolls off the platform directly onto the glass surface.

15 Claims, 6 Drawing Figures

GLASS SCORING HEAD AND METHOD

BACKGROUND OF THE INVENTION

In the final stages of a flat glass manufacturing operation, large sheets of glass are subdivided into a number of pieces having the desired final product dimensions. Problems have been encountered in this area due to difficulty in initiating contact between the scoring wheel and the surface of the glass precisely at the edge of the glass as they move relative to one another. The glass edge, as well as the scoring wheel, can be damaged if the scoring wheel is brought down with full force onto the edge itself or is lowered prematurely and then strikes the edge of the glass. On the other hand, if application of the full scoring force is delayed until the scoring wheel has passed over the glass some distance from the edge, the cut that is subsequently opened is often found to be defective at the end, since there was essentially no score impressed into the glass near that edge. Because of these problems, it is often necessary to trim off marginal portions of a sheet being subdivided, or to discard entire cut pieces which results in inefficient usage of each sheet. Therefore, it would be desirable if means were available for initiating a score in a sheet of glass substantially contiguous with the leading edge thereof.

This problem has been recognized in the past, but the proposed solutions have not been fully satisfactory. In U.S. Pat. Nos. 3,276,302 and 3,399,586, a roller rides onto the glass surface ahead of the scoring wheel so as to raise the scoring wheel to a predetermined scoring elevation prior to its striking the glass edge. Such arrangements may reduce the force of the impact of the scoring wheel on the glass edge but the action of the scoring wheel on the glass during the initial contact is believed to be less than a true scoring action since there is no rolling contact between the scoring wheel and the glass until the scoring wheel rebounds from the initial impact, begins passing along the upper surface of the glass, overcomes frictional forces, and then begins rotating. The result could be a substandard score in the immediate vicinity of the edge, which could lead to a defect in that region in the subsequently opened cut.

SUMMARY OF THE INVENTION

In the present invention the scoring wheel is made to initiate the desired rotating scoring action before it contacts any part of the glass. This is accomplished by first pressing the scoring wheel under full scoring force against a platform whose upper surface is brought into substantial alignment with the upper surface of the sheet of glass to be scored. As the leading edge of the glass contacts the front edge of the platform, the platform is pushed out from under the scoring wheel, causing the wheel to roll along the upper surface of the platform as the platform is being pushed, and when the glass edge comes under the scoring wheel, the scoring wheel rolls directly from the platform onto the glass surface. Such an arrangement has been found capable of reliably producing scores which apparently initiate at the very edge itself and which yield cuts that are essentially defect-free at the ends.

DESCRIPTION OF THE INVENTION

DETAILED DESCRIPTION

Figure 1:
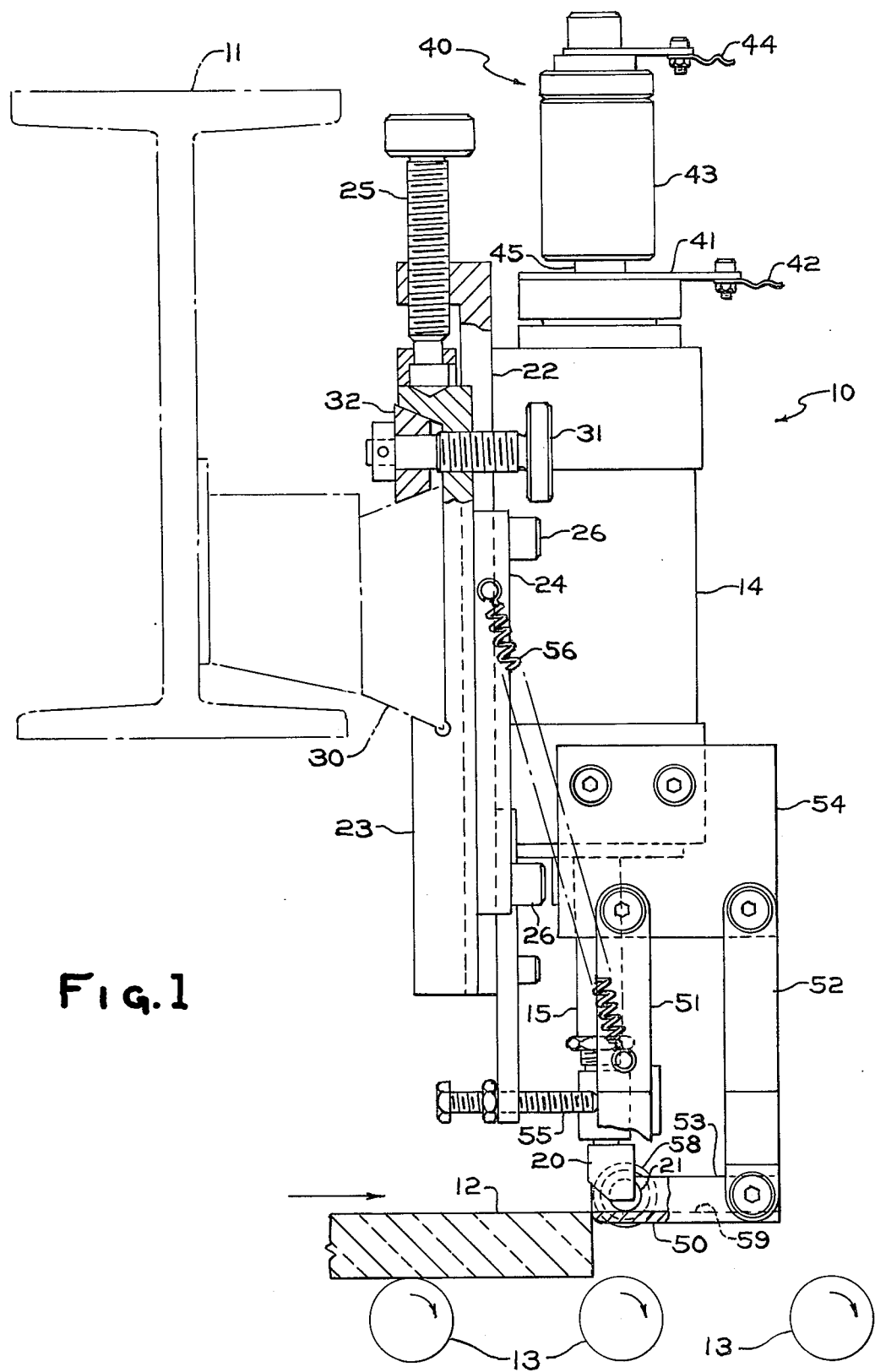
FIG. 1 is a side elevation, partially broken away, of a specific preferred embodiment of the invention, showing a sheet of glass about to engage a swingable platform onto which a scoring wheel is pressed.
Figure 2:
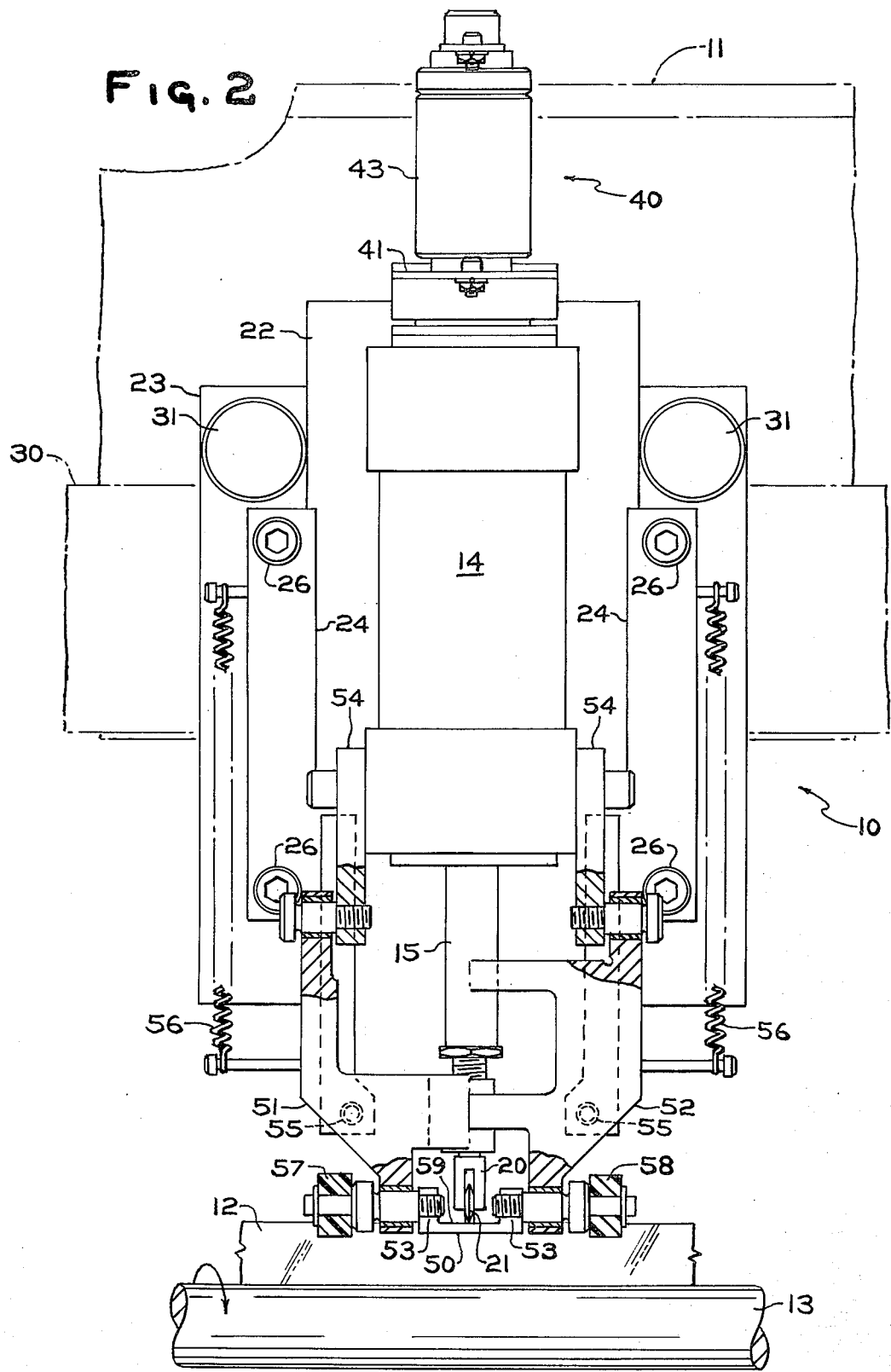
FIG. 2 is an end elevation, partially broken away, of the preferred structure shown in FIG. 1.
Figure 3:
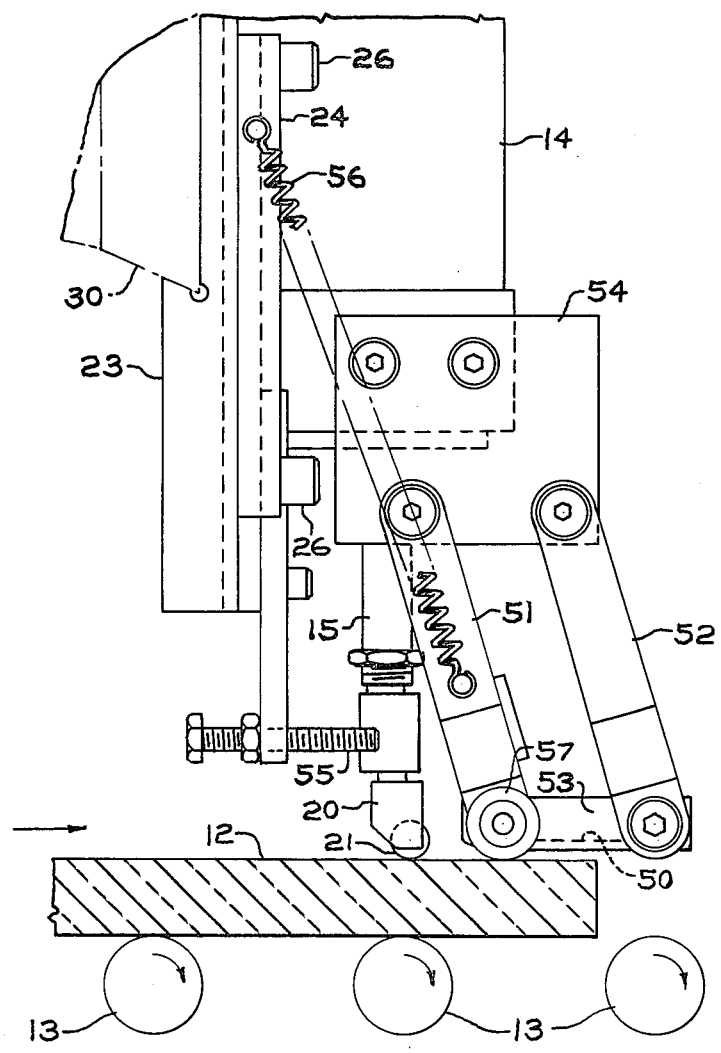
FIG. 3 is a fragmentary side elevation corresponding to the lower portion of FIG. 1, showing the platform swung out from under the scoring wheel and with the scoring operation under way.

FIGS. 1–3 depict a preferred embodiment wherein a scoring head 10 is affixed to a stationary beam 11, beneath which a sheet of glass 12 is being transported on conveyor rolls 13. It should be understood, however, that the invention is equally applicable to scoring operations involving movably mounted scoring heads which travel over a stationary sheet of glass. Referring now to FIGS. 1 and 2 in particular, the scoring head includes a conventional arrangement of a pneumatic or hydraulic cylinder 14 which vertically reciprocates a shaft 15, onto the end of which is threadably secured a pivotable scoring wheel holder 20 retaining a scoring wheel 21. Instead of a cylinder, the scoring force could be provided by solenoid or spring means. Cylinder 14 is secured to a vertically adjustable base 22, which is slidably held on a mounting frame 23 by means of grooved retainer bars 24 affixed to frame 23 by means of screws 26. Vertical adjustment of the base 22 is provided by an adjustment screw 25. Mounting frame 23 slideably engages a dovetail bar 30 so as to permit lateral adjustment of the scoring head. Screws 31 and wedges 32 serve to clamp frame 23 in place when the lateral position is established.

An optional feature shown in FIGS. 1 and 2 is a limit switch 40 mounted atop cylinder 14, which prevents the scoring wheel from striking the conveyor roll in the event that the cut should open during the scoring operation, and which detects the passage of the trailing edge of the glass under the scoring wheel so as to initiate retraction of the scoring wheel. A ring contact 41 and an electrical lead 42 are stationary, while an annular contact 43 and lead 44 are attached to the reciprocating upper cylinder shaft 45. When the shaft drop sufficiently to close the gap between contacts 41 and 43, the circuit is closed between leads 42 and 44, thereby activating the control mechanism for reversing the cylinder.

The advantages of the present invention stem from the provision of a platform 50 onto which the scoring wheel 21 may rest prior to a scoring operation, as shown in FIGS. 1 and 2. Platform 50, which may be made of steel, has flat upper surface 59 substantially parallel to the upper surface of the glass, and in the preferred embodiment is supported by a pair of bifurcated pivot arms 51 and 52. Both pivot arms are hinged at their lower ends to upstanding extensions 53 on platform 50, and hinged at their upper ends to brackets 54 which are attached to cylinder 14. The pivot arms are resiliently retained in a vertical position against adjustable stops 55 by a pair of tensioned coil springs 56. The front pivot arm 51 carries a pair of rollers 57 and 58 which protrude slightly below the bottom of platform 50.

In operation, the pivot arms 51 and 52 will be initially in the vertical position shown in FIG. 1. As a sheet of glass approaches the scoring head, cylinder 14 is activated to force the scoring wheel 21 downwardly against the upper surface 59 of platform 50 in the full scoring pressure. In FIG. 1, the leading edge of the glass sheet has just come into contact with the front of platform 50. With the next increment of travel by the glass, the glass will begin to push the platform ahead of it, thereby producing relative motion between the platform and the scoring wheel, which causes the scoring wheel to roll along the surface of the platform. As a result, the metal surface of the platform will be scored slightly, but this has not been found to be harmful, since after the first few operations the depth of the score in the platform appears to stabilize. Because of this metal-to-metal contact, however, it is usually preferred to use a mild steel in the fabrication of the platform.

As the platform is pushed back further, the scoring wheel continues rolling without interruption as it passes from the platform onto the surface of the glass. The elevation of the platform should be set so that at the critical moment when the scoring wheel transfers from the platform to the glass, the upper surface of the platform is essentially coplanar with the upper surface of the glass. Since the swinging motion of the platform includes an upward component of travel as it is pushed, the platform should initially have an elevation slightly lower than the upper surface of the glass. In the configuration of FIG. 1, this difference in initial elevations is so small that it is virtually imperceptible. While optimally the platform should be adjusted to be perfectly level with the glass at the moment when the scoring wheel passes over the interface, some finite error will always be present in the adjustment. When the margin of error is taken into account, it is preferred that the platform be adjusted slightly too low rather than too high, so as to assure contact of the scoring wheel with the very edge of the glass.

As arms 51 and 52 pivot back further in response to the continued advancement of the glass, the glass slips under the platform and rollers 57 and 58 engage the upper surface of the glass as shown in FIG. 3 to avoid scratching of the glass by the bottom of the platform. When the trailing edge of the glass passes the scoring wheel, limit switch 40 causes the scoring wheel to be raised. After the glass has cleared the scoring head, springs 56 return the pivot arms 51 and 52 to the vertical position so that the platform again underlies the scoring wheel. Scoring pressure may then be re-applied to the scoring wheel, thereby rendering the scoring head ready for the next scoring operation.

Figure 6:
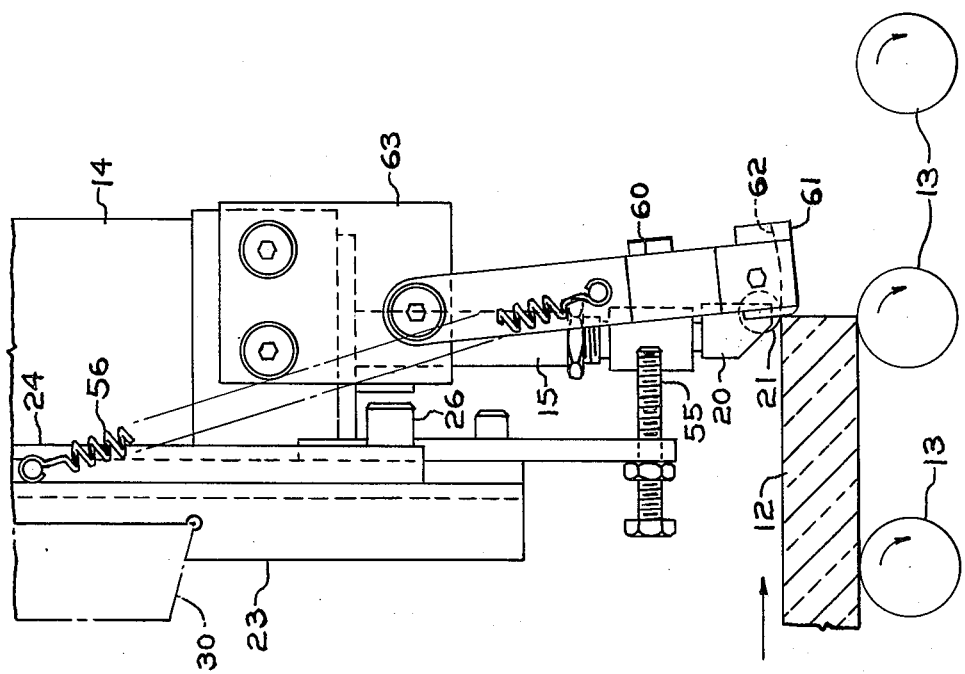
FIG. 6 is a fragmentary side elevation of the FIG. 4 embodiment, showing the initial moment of scoring.
Figure 4:
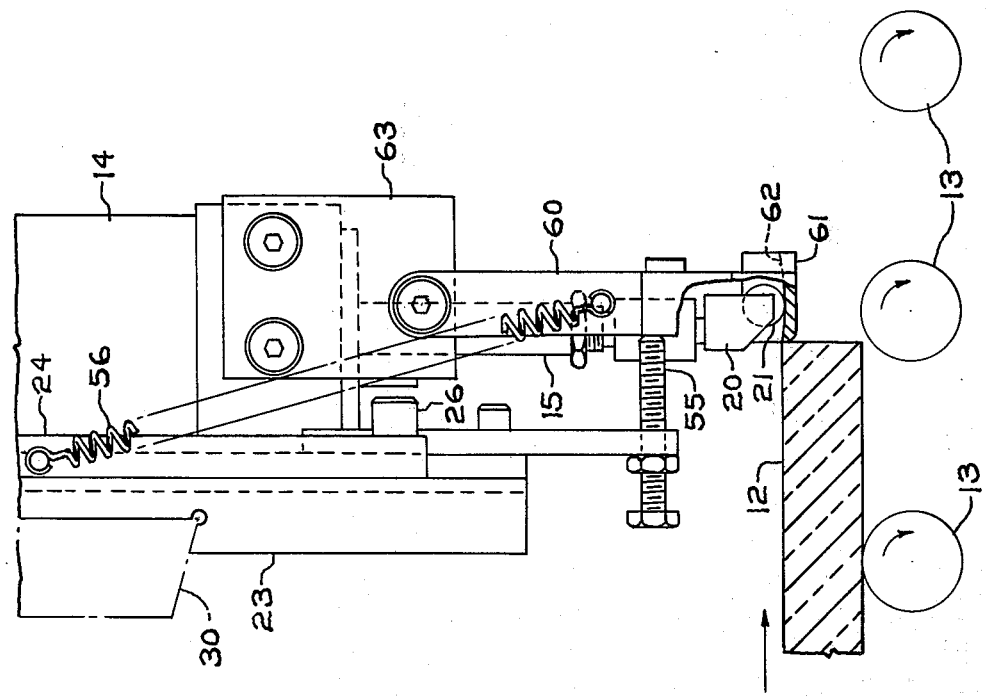
FIG. 4 is a side elevation, partly broken away, of an alternate embodiment of the invention.
Figure 5:
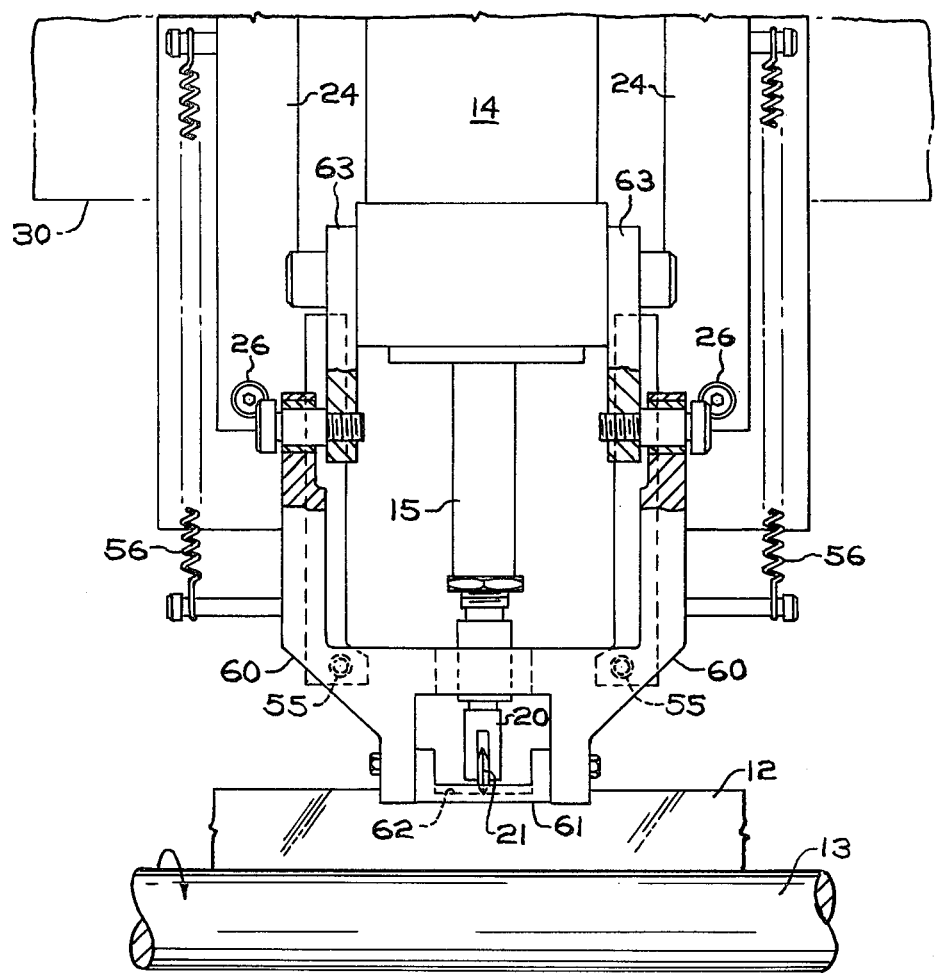
FIG. 5 is an end elevation, partly broken away, of the embodiment shown in FIG. 4.

Another embodiment of the present invention is shown in FIGS. 4–6, wherein like-numbered elements correspond to those described above in connection with the embodiment of FIGS. 1–3. This embodiment is substantially similar to the previous embodiment except that only a single bifurcated pivot arm 60 is provided, at the lower end of which is rigidly affixed a platform 61 having an arcuate upper surface 62. Arm 60 is hinged at its upper end to brackets 63. As can be seen in FIG. 6, the curved surface 62 of the platform is designed to be at the same elevation as the upper surface of the glass at the point of contact as the scoring wheel 21 passes from the platform onto the glass. More specifically, the upper surface of the glass becomes tangential to the arc of the platform along the line of abutment between the leading edge of the glass and the platform at the moment when the center of the scoring wheel is directly above the line of abutment. It should be apparent that such an arrangement provides for the initiation of a score at the precise edge of a piece of glass with a smooth, continuous rolling action.

The two specific embodiments shown in the drawings are, of course, merely exemplary. A wide variety of mechanical means could be employed to provide support under the scoring wheel and then retract from the path of the glass. For instance, the platform could be supported from below the glass rather than from above, and its movement could be rectilinear rather than arcuate. In scoring operations where the glass is stationary and the scoring head is carried on a movable bridge, the platform may take the form of a stationary ramp against which an edge of the glass is abutted. Other variations and modifications may be resorted to without departing from the spirit and scope of the invention as defined by the appended claims.

I claim:

1. A method for scoring a piece of flat glass comprising the steps of:
    pressing a scoring wheel under scoring force against a platform surface;
    bringing a piece of glass to be scored into edge-to-edge abutment with said platform, with a major surface of the glass at substantially the same elevation as said platform surface along the line of abutment therebetween;
    rolling the scoring wheel along said platform surface and directly onto said major surface of the glass so as to score the glass.

2. The method of claim 1 wherein said platform surface is planar and the scoring wheel is rolled from the platform onto the glass when the platform surface is substantially coplanar with the upper surface of the glass.

3. The method of claim 1 wherein said platform surface is arcuate and the scoring wheel is rolled from the platform onto the glass when the upper surface of the glass is substantially tangential to the curve of the platform surface at the line of abutment.

4. The method of claim 1 wherein the platform is pushed from under the scoring wheel by the glass.

5. The method of claim 4 wherein the glass is conveyed beneath the scoring wheel during the scoring operation.

6. The method of claim 4 wherein the glass remains stationary during the scoring operation.

7. An appartus for scoring pieces of flat glass comprising:
    a rotatably mounted scoring wheel;
    means for supporting a piece of glass in a scoring position beneath said scoring wheel;
    means for forcing said scoring wheel into a surface of a piece of glass in said scoring position;
    means for imparting relative motion along a predetermined scoring locus to said scoring wheel with respect to a piece of glass on said support means;
    platform means mounted in the path of said scoring locus and adapted for edge-to-edge abutment with a piece of glass on said support means, said platform being supported at an elevation where said scoring wheel can roll on a surface of the platform while said platform is in abutment with a piece of glass on said support means.

8. The apparatus of claim 7 wherein said platform means is movably mounted so as to permit the platform to be pushed by an abutting piece of glass.

9. The apparatus of claim 8 wherein said platform is carried by at least one hinged pivot arm which permits the platform to be removed from an abutting relationship with a piece of glass.

10. The apparatus of claim 9 wherein said scoring wheel is carried by a frame overlying said glass support means, and wherein said pivot arm is also carried by said frame.

11. The apparatus of claim 10 further including means for resiliently retaining said platform in a position underlying said scoring wheel.

12. The apparatus of claim 11 wherein the surface of said platform on which the scoring wheel rolls is arcuate.

13. The apparatus of claim 11 wherein the surface of said platform on which the scoring wheel rolls is planar, and the platform is carried by a pair of support arms hinged at both ends.

14. The apparatus of claim 11 wherein said means for supporting a piece of glass comprises a roller conveyor, and said means for providing relative motion comprises drive means for moving a piece of glass along said conveyor.

15. The apparatus of claim 11 wherein said means for providing relative motion comprises drive means for translating said frame over said glass supporting means.

* * * * *